United States Patent
Trammel et al.

(10) Patent No.: US 9,411,653 B2
(45) Date of Patent: Aug. 9, 2016

(54) SYSTEM AND METHOD FOR PROVISIONING AND LOAD BALANCING USER ACCOUNTS ON SERVER CLUSTERS

(75) Inventors: John Trammel, Bothell, WA (US); Mike De Laurentis, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1421 days.

(21) Appl. No.: 12/101,927

(22) Filed: Apr. 11, 2008

(65) Prior Publication Data
US 2014/0032477 A1  Jan. 30, 2014

(51) Int. Cl.
*G06F 15/173* (2006.01)
*G06F 9/50* (2006.01)
*H04L 29/08* (2006.01)

(52) U.S. Cl.
CPC ............ *G06F 9/5061* (2013.01); *H04L 67/1012* (2013.01); *H04L 67/1023* (2013.01)

(58) Field of Classification Search
CPC ............ H04L 67/1008; H04L 67/1012; H04L 67/1023

USPC ......................................................... 709/226
See application file for complete search history.

(56) References Cited

U.S. PATENT DOCUMENTS

| 7,328,237 | B1 * | 2/2008 | Thubert et al. ................. 709/203 |
| 2001/0039585 | A1 * | 11/2001 | Primak et al. ................. 709/228 |
| 2005/0262508 | A1 * | 11/2005 | Asano et al. ................... 718/100 |
| 2008/0177839 | A1 * | 7/2008 | Chang et al. ................... 709/205 |
| 2008/0320003 | A1 * | 12/2008 | Heinson et al. ................. 707/10 |

* cited by examiner

*Primary Examiner* — Glenford Madamba
(74) *Attorney, Agent, or Firm* — Shook, Hardy & Bacon, L.L.P.

(57) ABSTRACT

Providers of Internet based services must handle requests from many different customers. However, to make the experience simple and effective, a system for allowing a user to enter a simple Uniform Resource Locator based upon the user's identifier is provided that re-directs the user to a server cluster allocated to that user. The system is capable of periodic load re-balancing and can handle many different types of services for each user.

24 Claims, 12 Drawing Sheets

SYSTEM AND METHOD FOR PROVISIONING AND LOAD BALANCING USER ACCOUNTS ON SERVER CLUSTERS

TECHNICAL FIELD

The present invention relates to the field of computer networking. In particular, but not by way of limitation, the present invention discloses techniques for providing online computer server services to large numbers of client computer systems.

BACKGROUND

The global internet has become a mass commercial marketplace. The internet offers a wide variety of media such news websites, downloadable music, and video. The internet also offers many online commercial services such as investment services, banking, telecommunication, and computer services. The internet even provides a convenient means of obtaining physical products through the use of online merchants and auction sites.

Over the past twenty years many very large commercial businesses have been founded, grown, and prospered on the internet. These internet-centric businesses use the internet as their main (and sometimes only) method of communication with customers. These internet-centric businesses are able provide various goods and services to consumers in a very efficient manner since a number of automated customer handling systems are used to perform much of the interaction with their customers. For example, internet-based retail stores generally display products, accept product orders, and accept payment for product orders in a fully automated manner without any human intervention. In this manner, the internet-based retail stores are able to keep the cost of each customer transaction very low such that large numbers of transactions are able to be handled at a low cost. Thus, it is not uncommon for a commercial internet-based business to provide services to millions of different customers each day.

In order to provide services to millions of different consumers each day, the server systems of a large commercial internet-based business must be designed with great care. And as any successful business owner knows, a key to business success is consistency and reliability of service. Thus, large commercial internet-based business must provide fail-safe mechanisms that will keep the server systems of the business operating despite the inevitable failure of any individual component of the server systems. And since the Internet is available world-wide, there will always be a customer looking for services no matter what time of day it is such that the server systems must provide services twenty-four hours each day.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to the World Wide Web and the current implementation of the global internet, the teachings of the invention can be used with other types of network services and network protocols. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
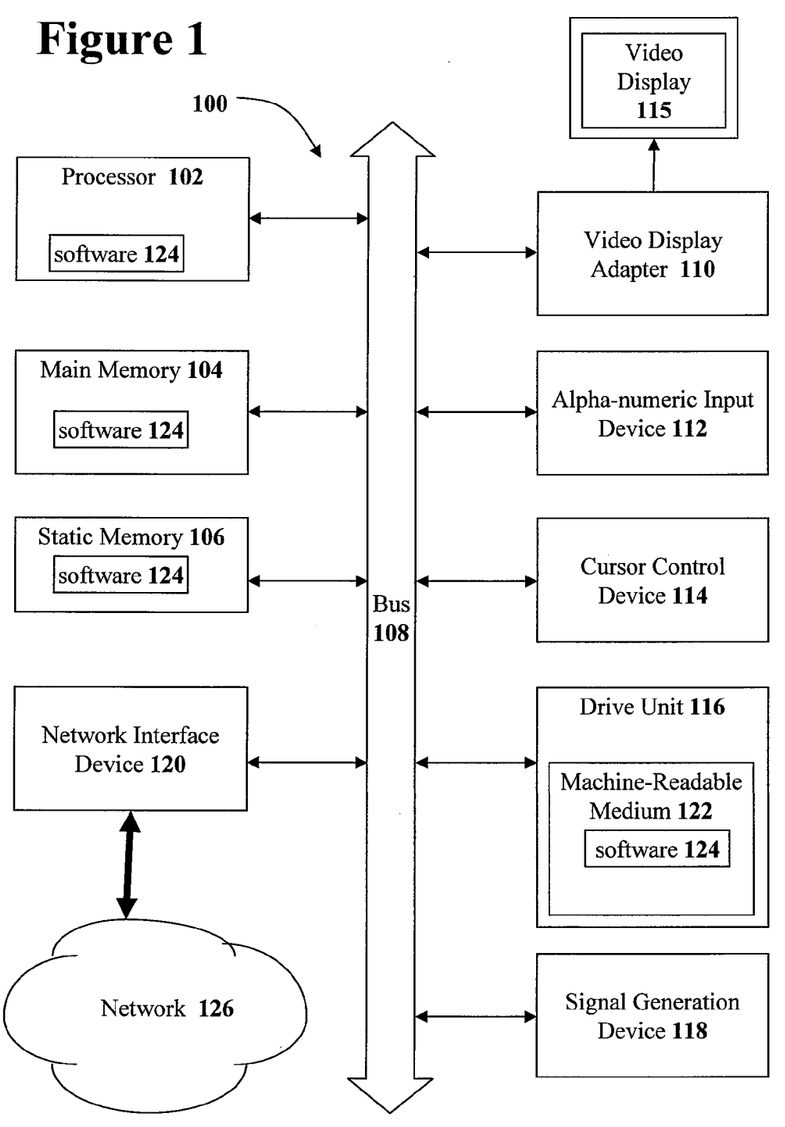
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of a machine in the example form of a computer system 100 within which a set of instructions 124, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein. Furthermore, a single machine may be used to designate a cluster of computer systems that are all assigned to provide the same computer service.

The example computer system 100 illustrated in FIG. 1 includes a processor 102 (e.g., a central processing unit (CPU), a graphics processing unit (GPU) or both), a main memory 104, and a static memory 106 that may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., such as a sound system for driving a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104, static memory 106 and/or within the processor 102 during execution thereof by the computer system 100. Thus, the main memory 104, static memory 106, and the processor 102 also constituting machine-readable media. The instructions 124 for operating computer system 100 may be transmitted or received over a network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, and magnetic media.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Client-Server Operations on the Internet

Computer systems that are coupled to a computer network, monitor the computer network for service requests from other computer systems, and then provide service when service requests are detected are known as "server" computer systems. Typical services provided by server computer systems include storing and retrieving files, performing specific processing tasks, and resolving addresses. The computer systems that request services from server computer systems are known as "client" computer systems. The interaction between client computer systems and server computer systems is known as client-server computing.

On the global internet, two very well-known client-server based applications are email and the World Wide Web. With email, a personal computer user typically runs a local email client program on the personal computer system. When the user wishes to send a newly composed piece of email or check if the user has received any new email, the local email client program will contact an email server system and request that the email server system route the new composed email or check for new email messages, respectively. With the World Wide Web, a personal computer user typically runs a web browser program on his local personal computer system. When the user wishes to view an internet web site, the user enters the address of the desired web site into web browser program such that the web browser program contacts the web server at the specified address, requests the files needed to display the web page at the entered address, receives those files from the web server, and then displays the web page on the local personal computer system.

Most internet based commercial businesses operate by placing computer server systems on the internet such that consumers may access those server systems using personal computers, cellular telephones, and any other type of consumer owned computer system that is coupled to the Internet. Virtually all internet-based commercial businesses provide a web site that acts as an initial contact point for consumers. Continued contact with the consumers may be through that web site or through other means such as a custom application downloaded by the consumer onto the consumer's computer system.

Large Scale Client-Server Operations on the Internet

To run a large scale business operation on the internet, the client-server model of computing described in the previous section must be greatly scaled up in order to handle the thousands or millions of consumers that wish to access the internet-based business. In order to scale up to be able to serve a very large number of consumer client systems making requests, an internet-based commercial business will generally replicate the various server systems such that a very large number of consumer client systems can be handled concurrently.

Figure 2A:
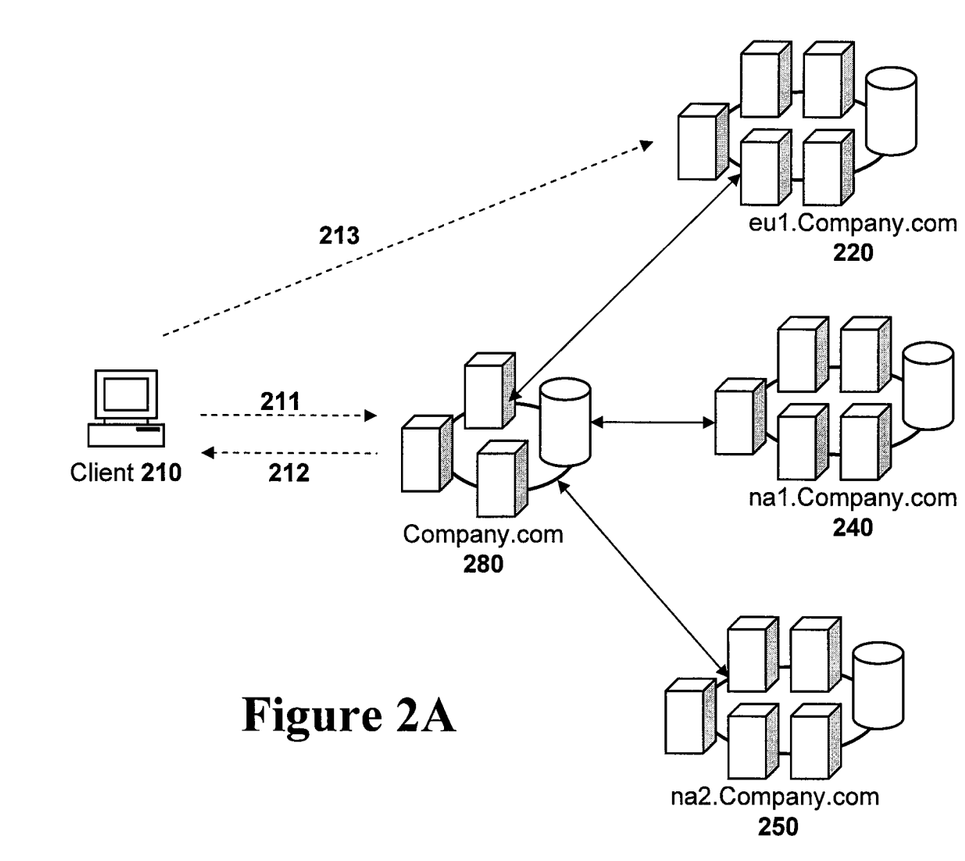
FIG. 2A illustrates a block diagram of an online server system with multiple server clusters for providing online services.

FIG. 2A illustrates one embodiment of a design for a large commercial internet based operation. In the example internet based commercial system of FIG. 2A, a front-end server cluster 280 handles initial requests from customers such as request 211 from client system 210. The front-end server cluster 280 will then select one of the server clusters (220, 240, or 250) that will handle that particular customer and then respond with a response message 212 that will indicate the selected server cluster. The client system 210 will then redirect its service request to the specified server cluster such as using request message 213.

To prevent an overload of the server systems, the system should efficiently allocate the various users across the different server clusters. In the server system illustrated in FIG. 2A, that means the various customers should be assigned to the various server clusters eu1.Company.com 220, na1.Company.com 240, and na2.Company.com 250. In this example embodiment, the eu1.Company.com server cluster 220 has been created to mainly handle Europe based customers while the na1.Company.com server cluster 240 and the na2.Company.com server cluster 250 have been created to handle North American based customers.

Internet Based Services on the Internet with Vanity URLs

Using the system illustrated in FIG. 2A, an online service may be provided to internet-based customers. The online service could be anything that capable of being performed online such as the offsite storage and retrieval of files for the customers of the system, telecommunication services, processing services, etc. To make it easy for a customer to access the customer's own pre-configured service location, it may be desirable to give the customer a vanity Uniform Resource Locator (URL). In this manner, the customer can enter the easily-remembered vanity URL in order to access the customer's own service location.

The system of FIG. 2A allows for the use of a vanity URL with the front-end server cluster 280. In one embodiment, a customer may contact the front-end server cluster 280 with a combination of the company's main web site URL and an assigned user identifier (user-id) to directly access the customer's own service location. For example, if a particular company owns the internet domain "company.com" then a customer with the user identifier 'userid' can directly access the customer's service with the URL "http://www.company.com/userid/". However, a user identifier need not be used as part of the URL. The user identifier, account name, or alias that appears in the URL is an assigned or user chosen string that may be changeable for the account. However, the system must not allow different users to select the same string due the aliasing that will occur. Referring back to FIG. 2A, the front-end server cluster 280 will respond to an access of a user's vanity URL with a re-direction to a location assigned to that customer within a specific server cluster assigned to that customer.

Initial Provisioning of Customers to Service Clusters

As set forth earlier, customers should be assigned to server clusters in an efficient manner in order to balance the load on the available server clusters. To disclose the allocation of customers to the server clusters, several allocation examples will be presented with reference to FIG. 3 and FIGS. 2B to 2F.

Figure 2B:
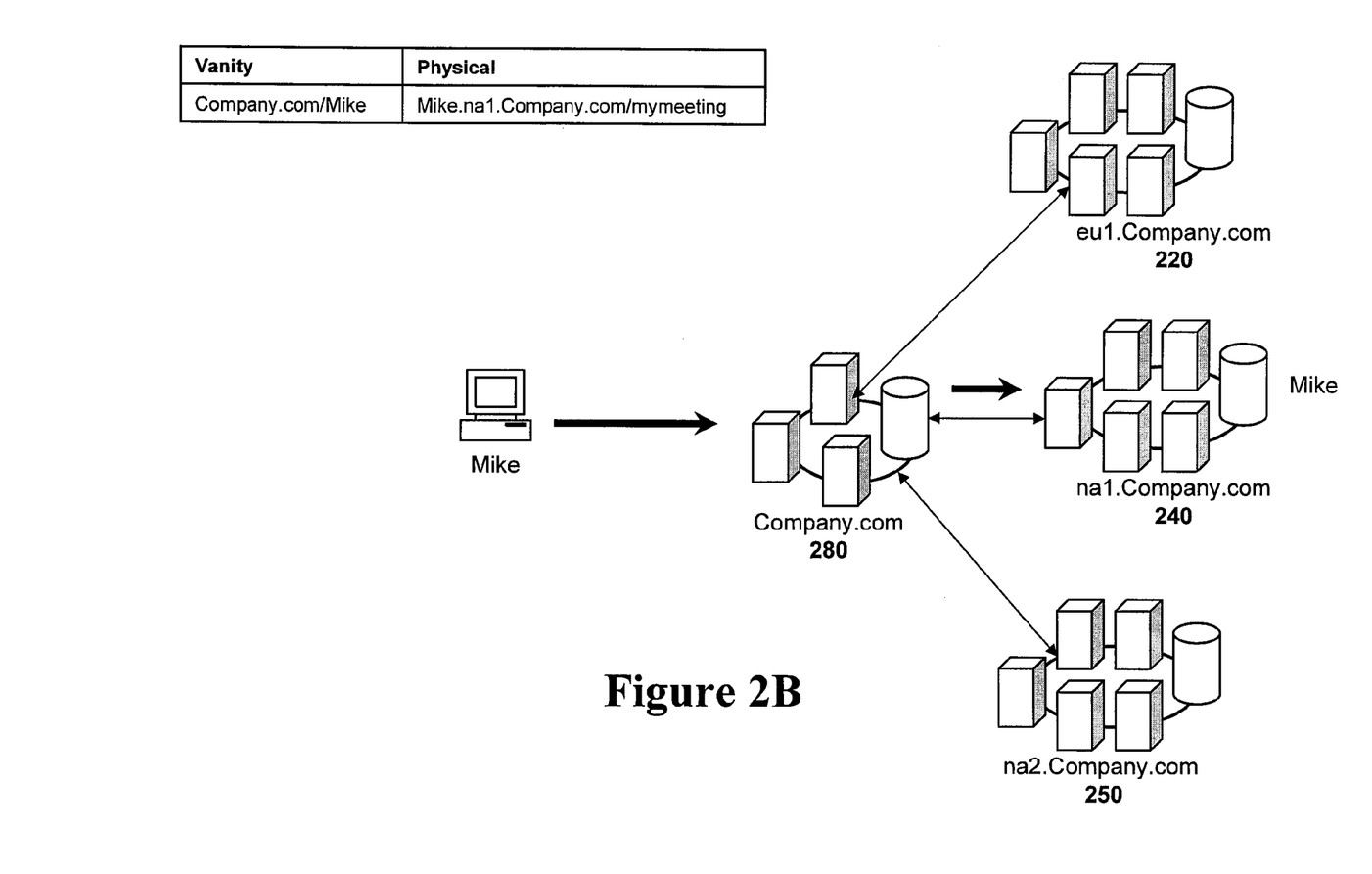
FIG. 2B illustrates the block diagram of FIG. 2A with a first user account added to server cluster na1.company.com.
Figure 3:
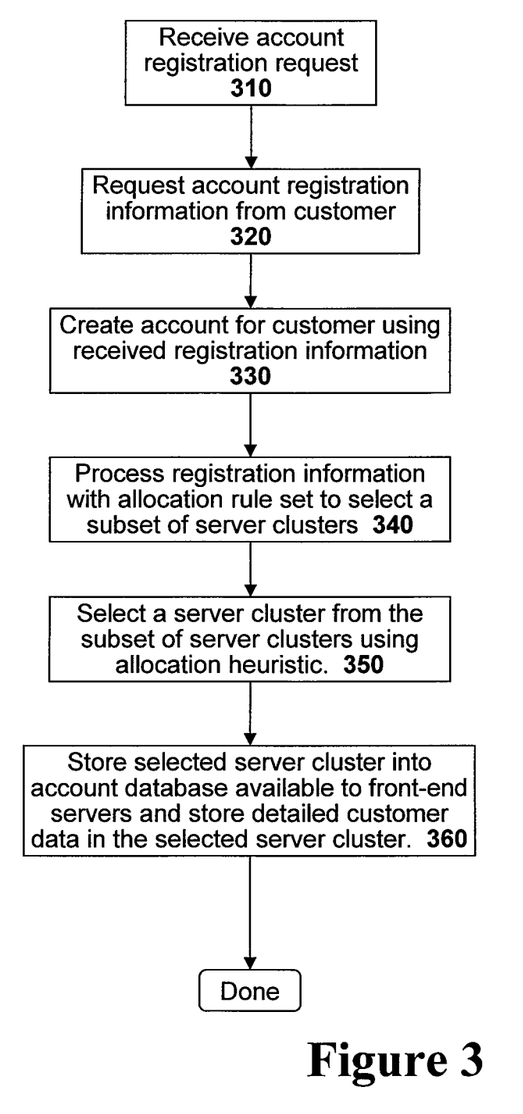
FIG. 3 illustrates a flow diagram describing an account provisioning method according to one embodiment.

Referring to FIG. 2B, an internet user 'Mike' may contact the front-end server cluster 280 and request a registration to begin as a customer. FIG. 3 illustrates a flow diagram that one embodiment of the present invention may implement. Thus, the first stage 310 in FIG. 3 specifies that the system receives an account registration request. In response, the system will then request account registration information from the customer at stage 320. Note that this may be performed by a server in the front-end server cluster 280 or by any other server designated by front-end server cluster 280. Once the system receives the account registration information from the user, the system will create a customer account for the new customer at stage 330. The customer account will include a user identifier (user-id). The information for the customer account will be stored into a database that is accessible by front-end server cluster 280.

After creating a new user account at stage 330, the system then should assign the new customer to a specific server cluster that will handle service requests for the new customer. In one embodiment, a two stage server cluster allocation system is used. A first stage processes the new customer's registration information with an allocation rule set to select a subset of candidate server clusters and then a second stage allocates a specific server cluster from the set of candidate server clusters.

Referring to FIG. 3, the first stage 340 processes the new customer's registration information with an allocation rule set that is designed to select a subset of server clusters that are most appropriate for this user based on the registration information received at stage 320. For example, referring to FIG. 2B, Mike may have indicated that he is located in the United States of America. Thus, the allocation rule set may select the server clusters na1.Company.com 240 and na2.Company.com 250 as a subset of potential server clusters since those two server clusters have been designated for North American (NA) users.

It should be noted that this is simply one example and that there are a large number of different rules that could be created to select a potential subset of server clusters for a specific new customer. For example, the system could detect which particular Internet Service Provider (ISP) the customer is using and use that information to select a subset of server clusters that have the best internet connections to that particular Internet Service Provider. Alternatively, a new customer may indicate that he is part of a particular company that has a corporate account with this internet business. In such an instance, the system may select a subset of server clusters that have been designated to handle all the customers that are part of that corporate account. In one embodiment, customers that are signing up for free or advertising supported accounts may be directed to a lower priority server cluster. (This document uses the term 'customer' for any online service user whether the online service user is paying or not and whether the online service user is a human or another machine.)

After selecting a the subset of candidate server clusters at stage 340, the system then proceeds to select a specific server cluster for the new customer. At stage 350, the system proceeds to use some allocation heuristic to select a specific server cluster for the new customer from the selected candidate subset of server clusters. Many different allocation heuristics may be used such as a round robin allocation system or a hash of the user-id. In one specific embodiment, a calculation of the resources in each of the candidate server clusters is made along with an accounting of the user accounts assigned to each candidate server cluster. The system then selects the candidate server cluster with greatest resources to user account ratio. In this manner, more powerful clusters will be assigned more user accounts such that the workload is distributed evenly across the server clusters.

In the example of FIG. 2B, the system selects server cluster na1.Company.com 240 as the server cluster that will provide services for the new customer Mike. After selecting the server cluster for the new customer then the selected server cluster may be stored in a user account database that is available to the front-end servers 280 at stage 360. In alternate embodiments the system may keep a master database but can replicate and transform the server cluster assignment data to whatever form is most appropriate for the front end systems. For example, in an embodiment that uses host names within a sub-domain (mike.company.com) for the vanity URLs instead of a path within the main host-domain sit (company.com/mike) then the assignment of the server clusters to accounts would be entered into the configuration of the DNS servers for that sub-domain. This technique could also be used to handle aliasing of email accounts to sub-domain servers, to avoid the need for monolithic installs or homing of user accounts on mail servers closer to where they would be used.

Figure 2C:
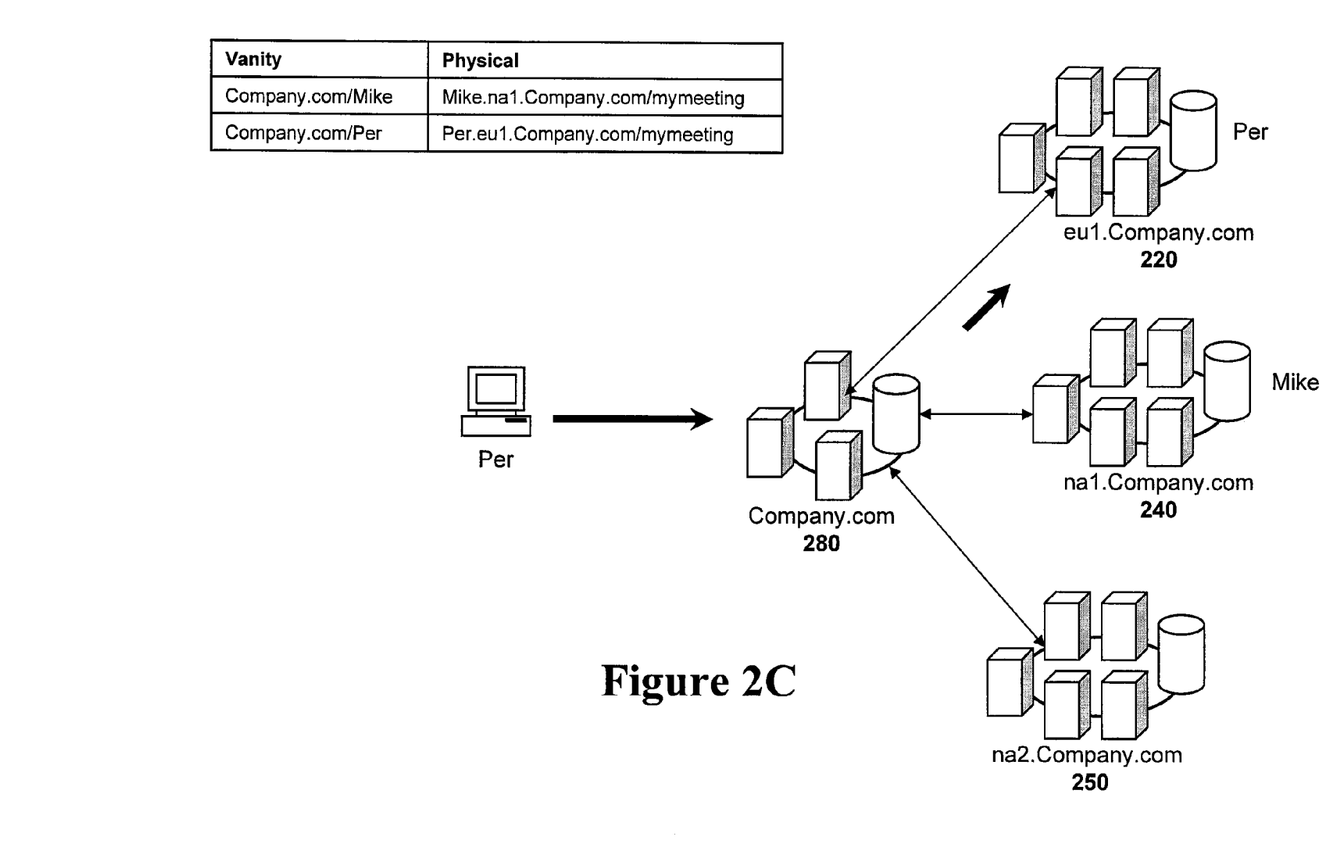
FIG. 2C illustrates the block diagram of FIG. 2B with a second user account added to server cluster eu1.company.com.

Detailed customer data is also stored in the selected server cluster (server cluster na1.Company.com 240 in this example). As an end-result, Mike is associated with server cluster na1.Company.com 240 as illustrated in FIG. 2B. Furthermore, the upper-right of FIG. 2B illustrates a vanity URL (Company.com/Mike) that new user Mike may use to access his services and a translation of that vanity URL into another URL (Mike.na1.Company.com/mymeeting in this particular example) that will be used if Mike attempts to use a meeting service. Note that the 'mymeeting' aspect is just an example for a possible online meeting application FIG. 2C illustrates second example of a new customer being added to the online service system. In the example of FIG. 2C, a new customer named Per from Sweden contacts the front-end server cluster 280 and registers for a new account with the online service. Per's account registration will be processed as per the method set forth in FIG. 3. When the system reaches the allocation rule set application stage 340 during Per's registration, the system will select the server cluster eu1.Company.com 220 as the only appropriate server cluster such that Per will be assigned to server cluster eu1.Company.com 220. Note that Per's new vanity URL (Company.com/Per) and the translation to the assigned server cluster (per.eu1.company.com/mymeeting) are listed in the table in the upper-left corner of FIG. 2C.

Figure 2D:
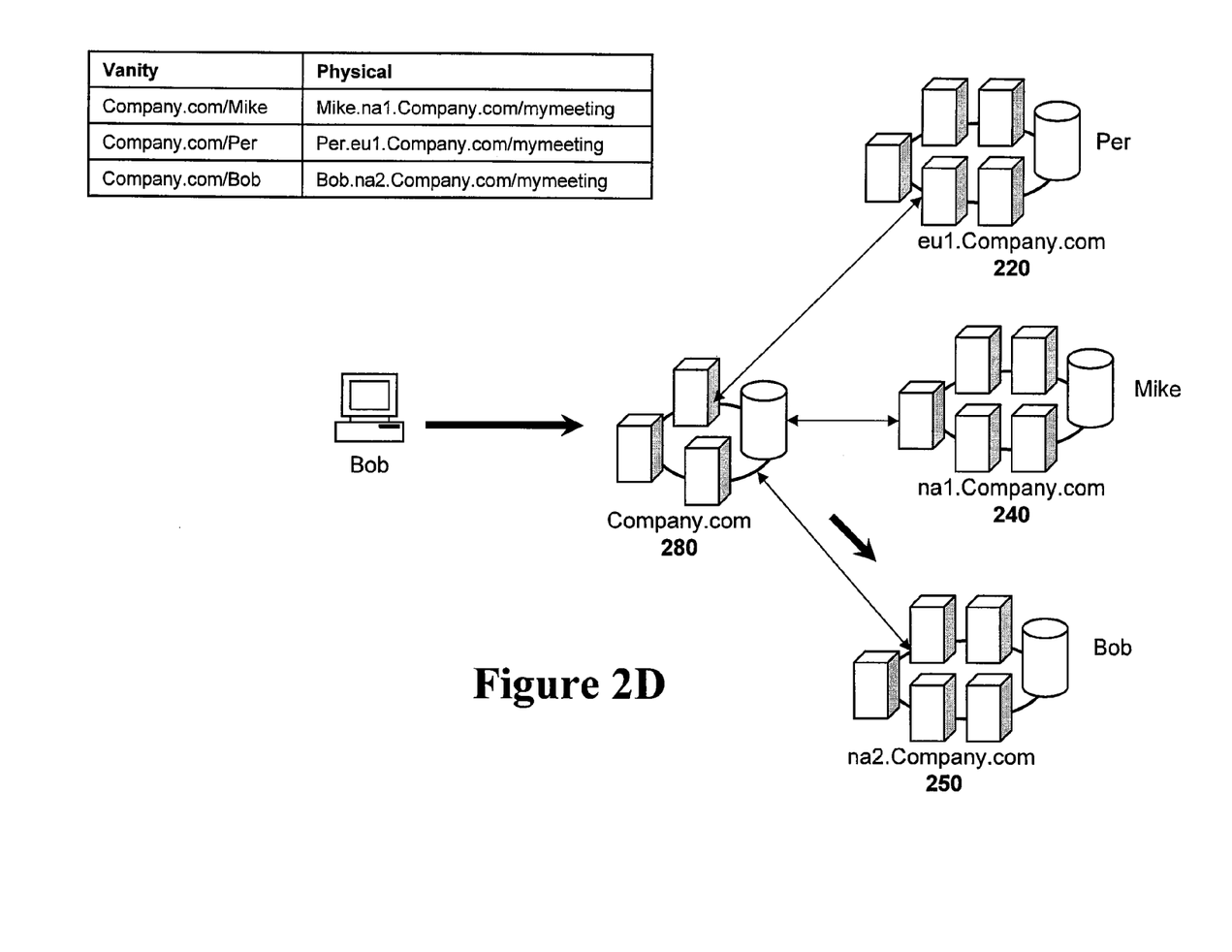
FIG. 2D illustrates the block diagram of FIG. 2C with a third user account added to server cluster na2.company.com.
Figure 2E:
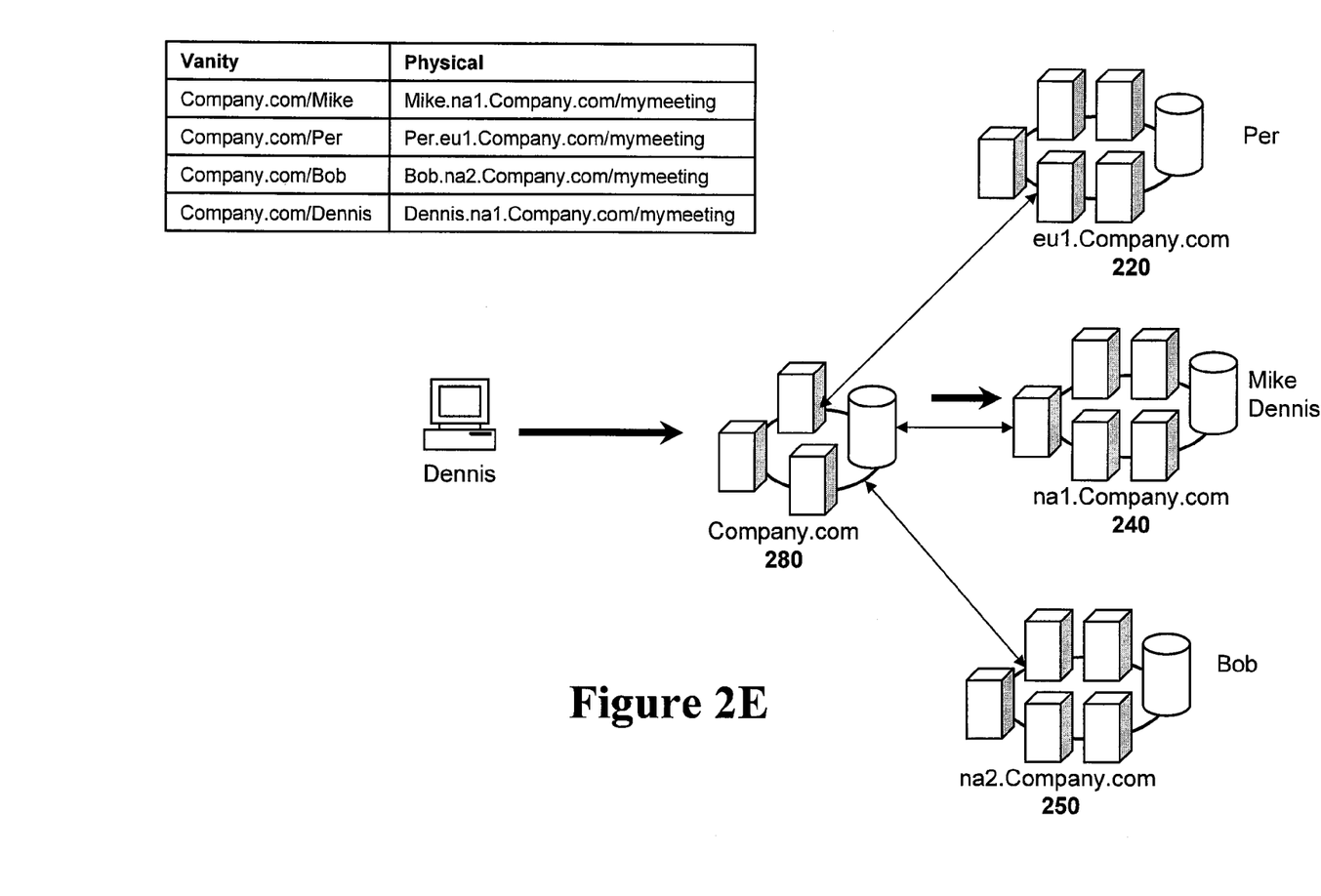
FIG. 2E illustrates the block diagram of FIG. 2D with a fourth user account added to server cluster na1.company.com.
Figure 2F:
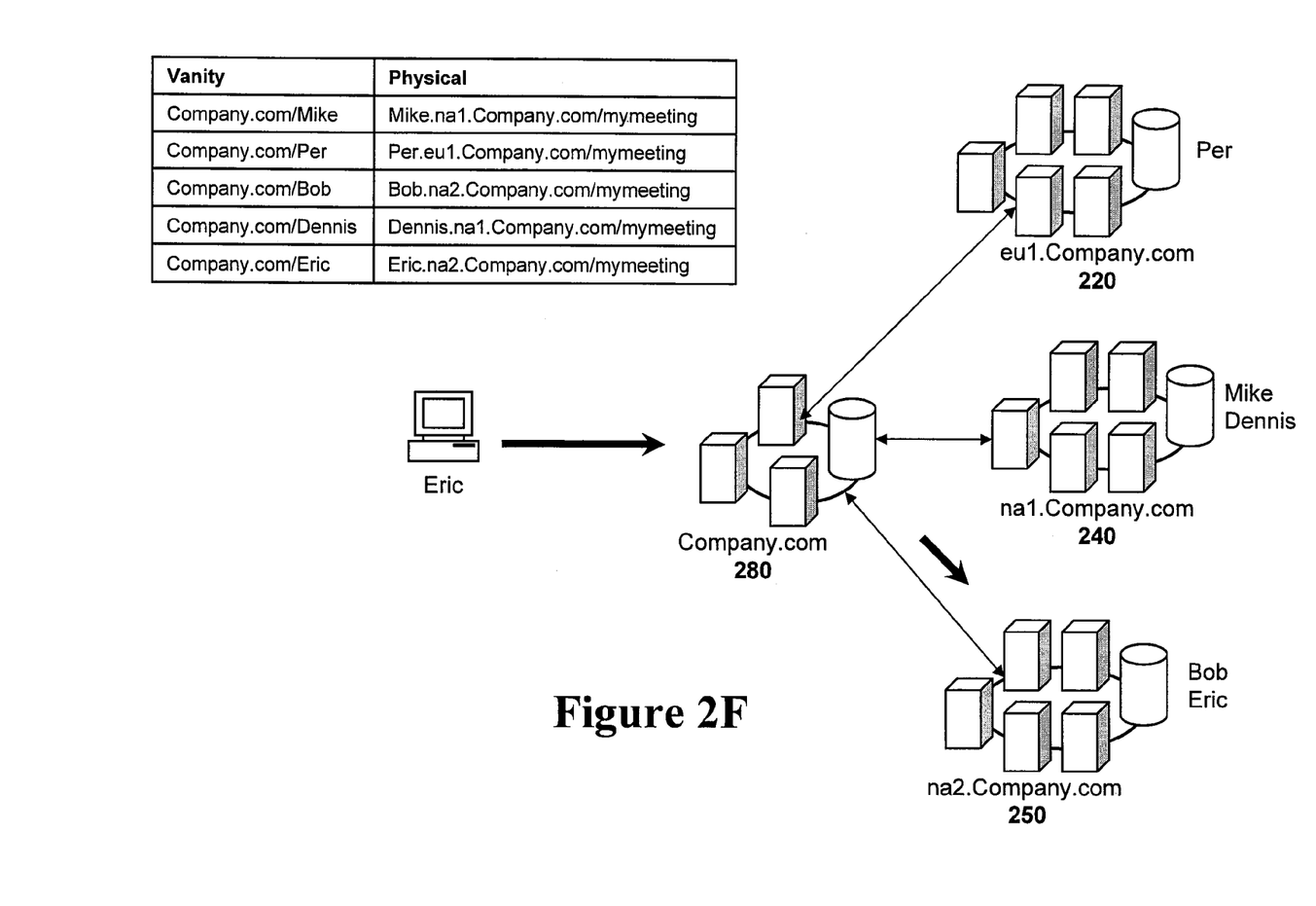
FIG. 2F illustrates the block diagram of FIG. 2E with a fifth user account added to server cluster na1.company.com.

FIG. 2D illustrates a third example of a new customer from Canada named Bob. When Bob registers for an account, the system will process his registration with the allocation rule set at stage 340 that will select server clusters na1.Company.com 240 and na2.Company.com 250 as the subset of potential server clusters for Bob. Then, in stage 350, an allocation heuristic will select between those two potential server clusters. If a load balancing calculation allocation heuristic is used, the system will then select na2.company.com 250 as the server cluster for Bob since server cluster na2.company.com 250 has no user accounts yet whereas the other possible North American server cluster already has account 'Mike' assigned to it. FIGS. 2E and 2F illustrate the online server system as two more new North American based customers, Dennis and Eric, are added to the online server system.

Providing Service to Online Customers with the Vanity URLs

Figure 2G:
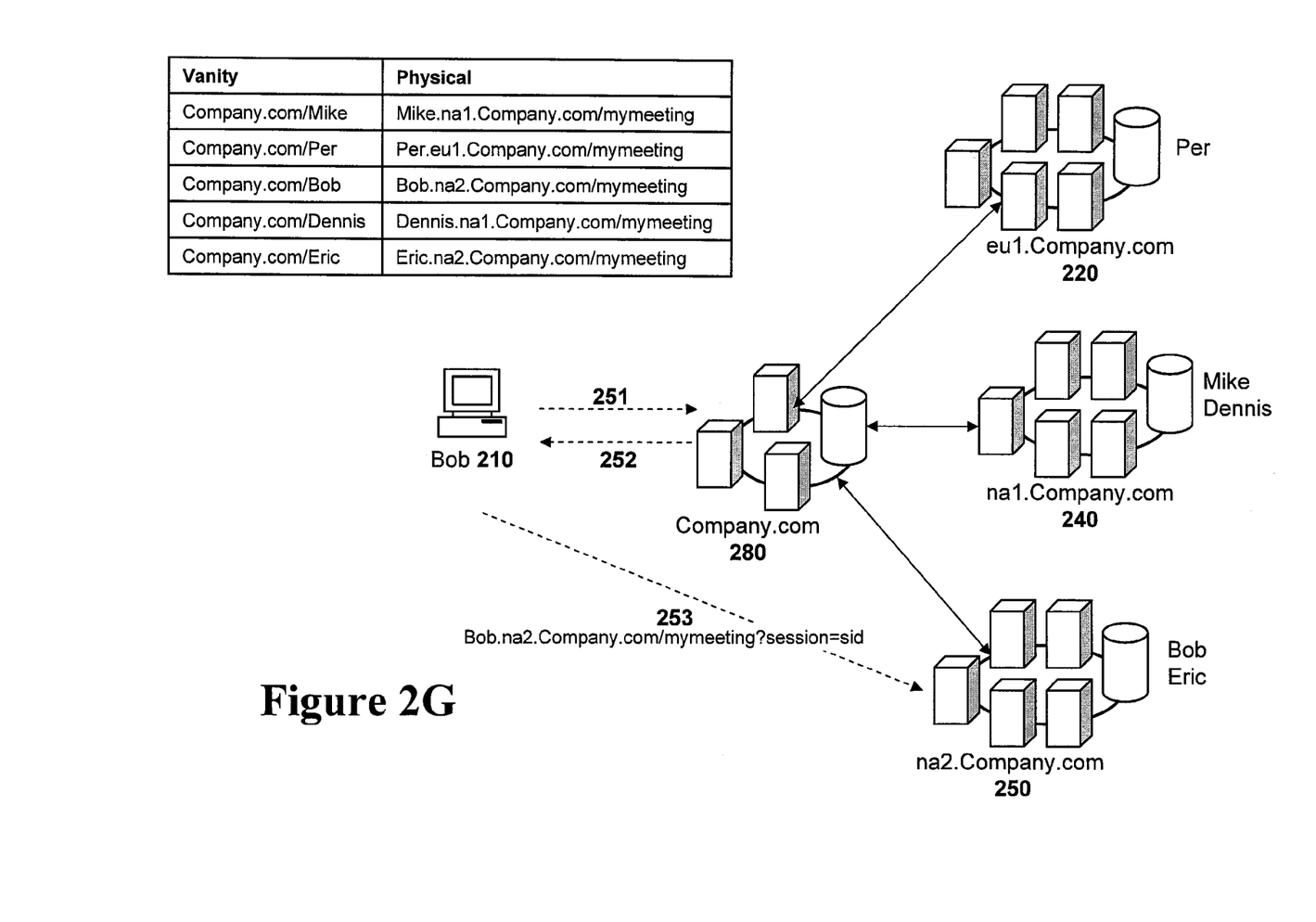
FIG. 2G illustrates the block diagram of FIG. 2F with a user Bob accessing Bob's user account on the na2.company.com server cluster assigned to Bob's user account in FIG. 2D.

As set forth above, each of the customers for the system illustrated in FIGS. 2A to 2F is given an easy-to-remember vanity URL to access the customer's individual online service account. FIG. 2G illustrates an example of the customer Bob accessing a meeting application using his vanity URL. Bob's client system 210 contacts the front-end server cluster 280 with his vanity URL http://www.company.com/Bob with a request message 251. In some embodiments, the front-end server cluster 280 may then require Bob to authenticate himself before allowing Bob to proceed further. In an alternate embodiment, the server cluster assigned to the customer will perform the customer authentication. After authentication (if performed by the front-end server cluster), the front-end server cluster 280 may issue a re-direct message 252 that redirects customer Bob's web browser to the proper location within the server cluster assigned to customer Bob. In the embodiment of FIG. 2G, Bob's client system 210 may then redirect itself to Bob's assigned server cluster na2.company.com 250 using the received re-direct URL such as http://Bob.na2.company.com/mymeeting?session=sid as illustrated by request message 253 in FIG. 2G.

Note that the transformation example in the preceding paragraph is only one possible transformation to a unique customer location in the assigned server cluster. In preceding example, sub-domains are used to identify different customer account locations. In other embodiments different transformations may be used. For example, an alternate embodiment may use sub-directories to identify different user account locations such that Bob may be re-directed to http://na2.company.com/Bob/mymeeting.

The same user-id and front-end server cluster 280 can be used to create and maintain vanity URLs for many different types of services. For example, once Bob has created the user-id 'Bob' at company.com, a URL of http://storage.company.com/Bob could direct Bob to a file storage service and http://phone.company.com/Bob could direct Bob to a Voice Over Internet Protocol (VoIP) telecommunication service. The front-end server cluster 280 would re-direct Bob to an assigned set of server clusters for the specific service type requested.

The vanity URL system may also be used to directly access sub-accounts and documents related to an account. For example, suppose that customer 'Bob' had two different meeting sub-accounts (meeting1 and meeting2), three documents in his main account (document1, document2, and document3), and two additional documents (document1 and document 2) in a folder (folder1). These different account resources could be directly accessed using the following vanity URLs that map to associated unique customer locations.

| Direct Vanity URL | Unique customer location in server cluster |
| --- | --- |
| company.com/bob/meeting1 | na1.company.com/bob/meeting1 |
| company.com/bob/meeting2 | na1.company.com/bob/meeting2 |
| company.com/bob/document1 | na1.company.com/bob/document1 |
| company.com/bob/document2 | na1.company.com/bob/document2 |
| company.com/bob/document3 | na1.company.com/bob/document3 |
| company.com/bob/folder1/document1 | na1.company.com/bob/folder1/document1 |
| company.com/bob/folder1/document2 | na1.company.com/bob/folder1/document1 |

In one embodiment, a single vanity URL (such as http://www.company.com/mike/) could direct customer Mike to a web page that presents customer Mike with various different service options available to the customer. Then when the customer selects the service option (telephone service, file storage service, document editing service, etc.), the web page would then direct the customer to server cluster assigned to that customer for that particular service. In such an embodiment, the web server would need access to a database containing all the server cluster assignments in order to create the personalized service web page for the customer containing the links to the proper assigned server clusters for each different type of service.

Periodic Load Re-Balancing

As customers continue to register for and use the system, the type of usage and the amount of usage by each customer will be logged. Over time, the amount of work assigned to each server cluster will change as new customers are added, old customers leave, some customers allow their accounts to become idle, and other customers become avid users. Thus, periodic load re-balancing may be required in order to keep the work load evenly distribute across the available server clusters.

Various different factors may be considered when performing load re-balancing. Obviously, the amount of service usage by each particular customer is a very important factor to consider. However, many other factors such as geographic distribution, interactions between customer accounts, and service levels (free, paid, corporate, etc.) may also be considered.

Figure 4:
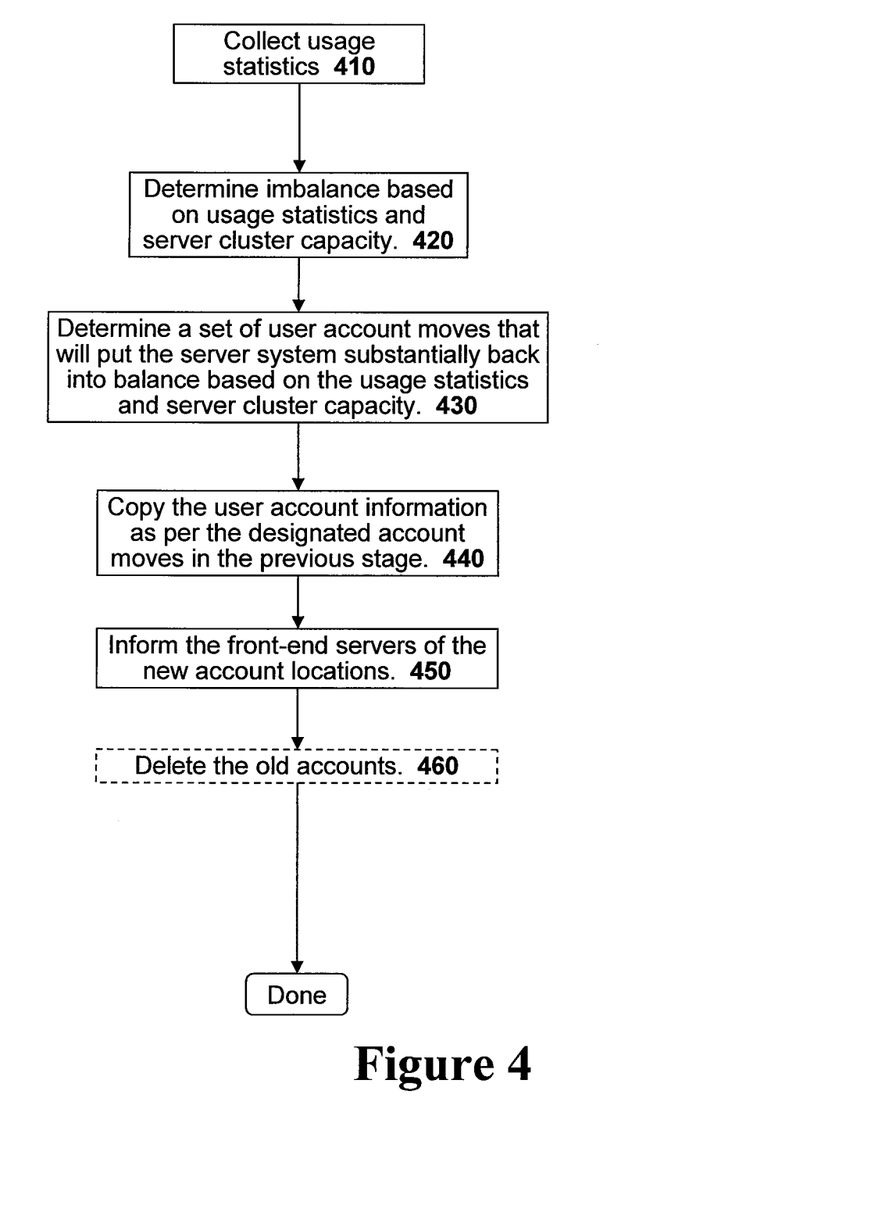
FIG. 4 illustrates a flow diagram describing a server system re-balancing method according to one embodiment.
Figure 5A:
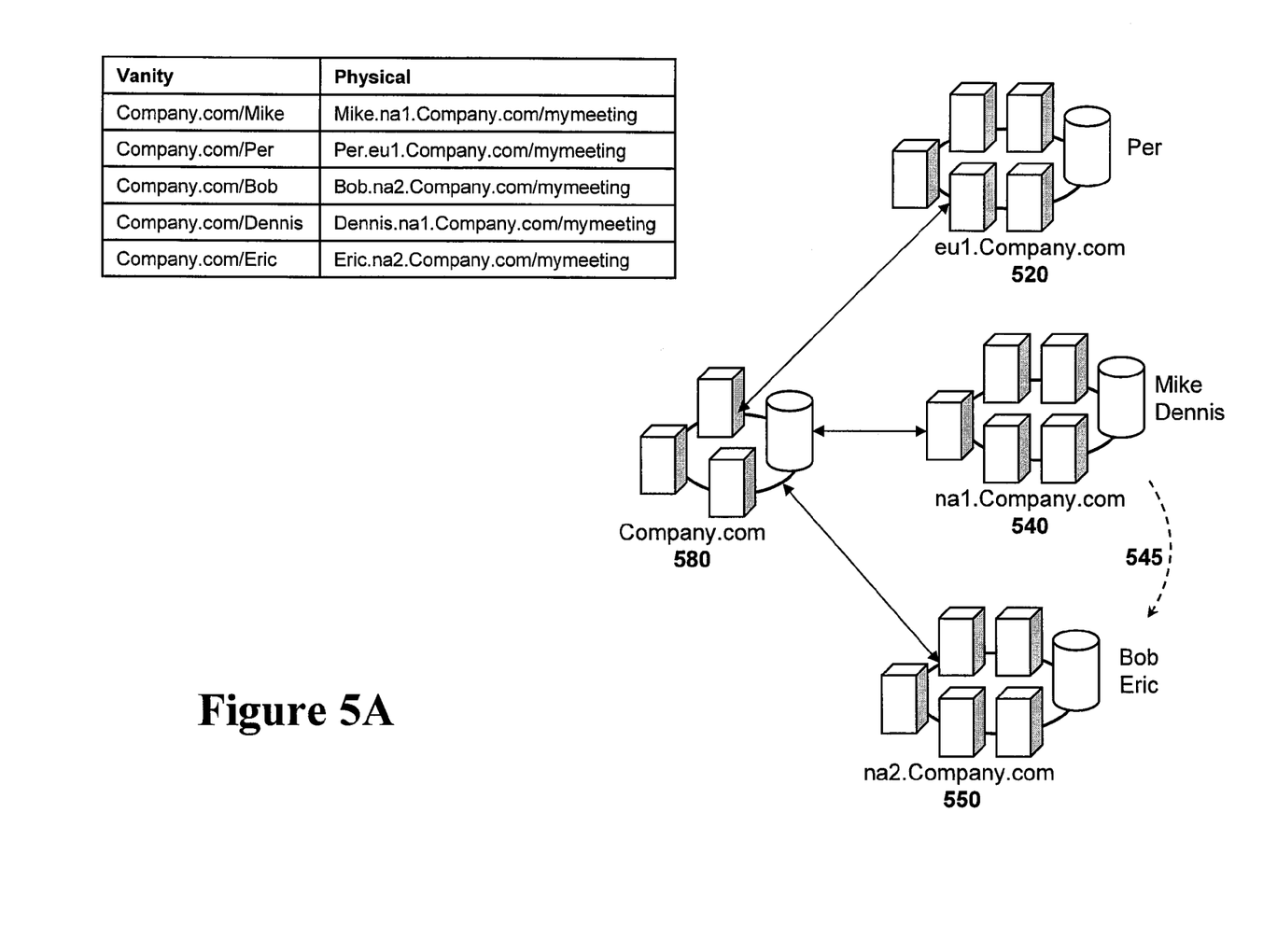
FIG. 5A illustrates the block diagram of FIG. 2F with a proposed move of an account for a load re-balancing.

FIGS. 4, 5A, and 5B illustrate an example of load balancing performed based on customer usage of an online meeting service. As set forth in FIG. 4, the first stage 410 is to collect usage statistics. Referring to FIG. 5A, assume that after time it is discovered that customers Mike and Dennis have about fifty meetings each day but Bob and Eric only have about one meeting per week.

Next, at stage 420, the system calculates an imbalance based on the collected usage statistics. In the situation of FIG. 5A, the imbalance calculation would determine that server cluster na1.company.com 540 would have a very heavy workload whereas the workload of server cluster na2.company.com 550.

After calculating the imbalance, the system determines a set of account moves to put the system substantially back into balance as specified in step 430. To remedy the situation of FIG. 5A, one of the heavy users on the server cluster na1.company.com 540 should be moved to the server cluster na2.company.com 550 that has a relatively light load. This can be accomplished by moving user Dennis from server cluster na1.company.com 540 to server cluster na2.company.com 550. Next, at stage 440, the system copies the account information from the source server cluster to the destination server cluster for each designated move. Thus, the Dennis account information is copied from server cluster na1.company.com 540 to server cluster na2.company.com 550 as designated by arrow 545.

Figure 5B:
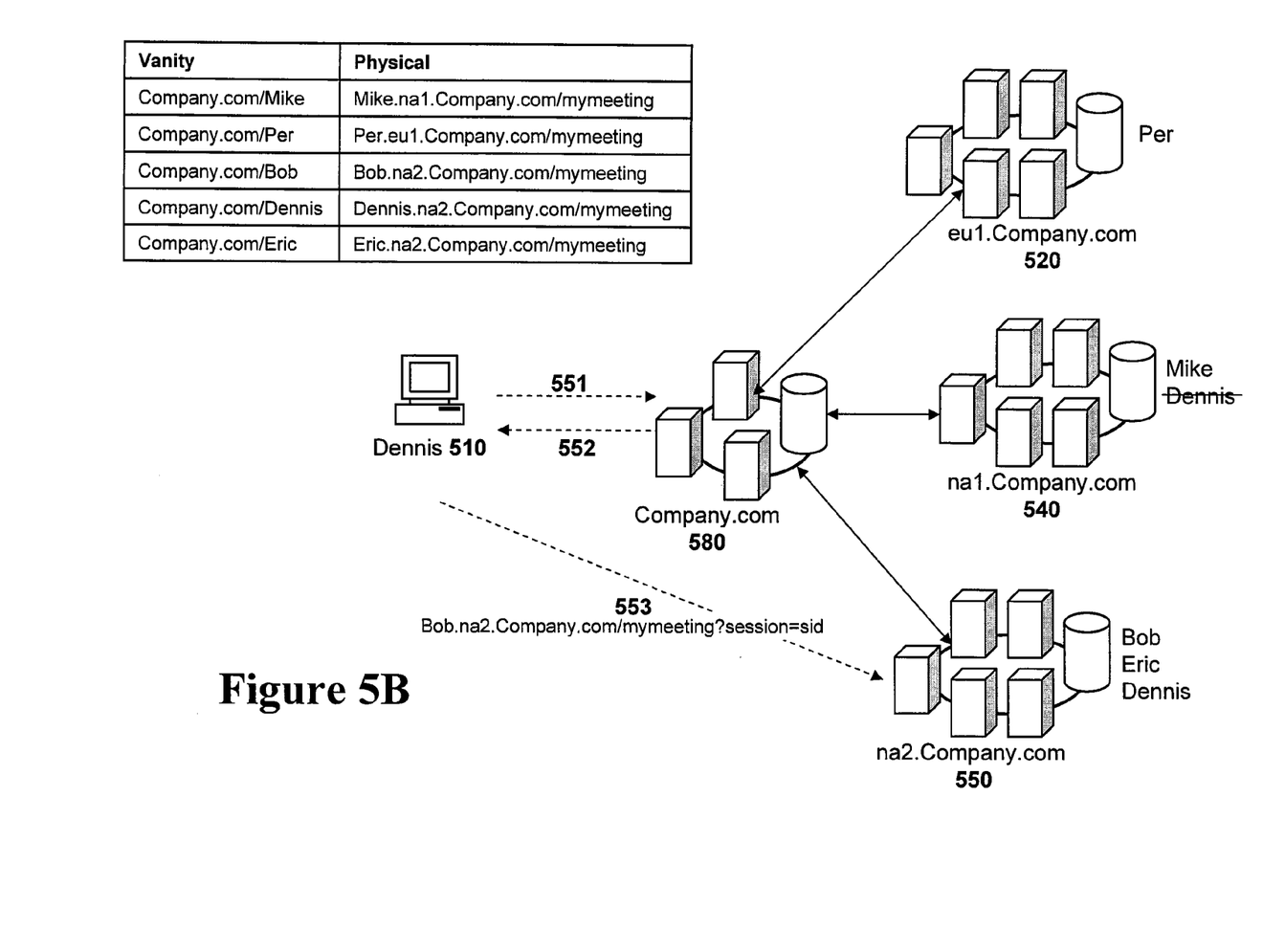
FIG. 5B illustrates the block diagram of FIG. 5A with the proposed re-balancing move of FIG. 5A in effect and a user accessing the user's account at the new location.

Finally, at step 450, the front-end servers are informed about the new account locations. This brings the re-balanced system into effect as illustrated in FIG. 5B. Specifically, the table illustrated in the upper-left corner of FIG. 5B now associates Dennis with the server cluster na2.company.com.

After a user has used a new account from the new location, the old account information may then be deleted as specified in stage 460. If a user manages to use an account at its old location, such as due to outdated cached Domain Name Service (DNS), any changes to that user's information should be propagated to the new account location. In one embodiment, the system will inform the server clusters about accounts that have been relocated such that the old server cluster can redirect a user to the user's new server cluster location. If the amount of account information is not excessive then the account information may be kept in place at the old cluster for some time as a back-up for the user's account information.

Adding New Capacity with Load Re-Balancing

It should be appreciated that this exact same load-balancing system can be used when adding new server capacity to an online server system. For example, when a new server cluster is introduced to an online service system then the systems that collect usage statistics are informed about the new server cluster and its usage statistics are all initially set at zero.

When the new server cluster is ready to be brought online, the system administrators then force a load re-balancing to occur. Since the usage statistics of the new server cluster have all been set to zero, the re-balancing system will calculate a significant load imbalance at stage 420 in FIG. 4. To remedy the imbalance, the re-balancing system will specified moving a number of customer accounts to the new server cluster at stage 430. After customer accounts have been moved to the new server cluster at stage 440, the front-end servers will be informed about the new server cluster at stage 450 such that the new server cluster may begin operation.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of providing online services from more than one computer cluster, said method comprising:
   accepting a registration for online services from a first customer, said registration comprising a first set of information about said first customer;
   processing said first set of information about said first customer with an allocation rule set to determine a subset of computer clusters from said more than one computer clusters, the first set of information about said first customer including data representative of an account and the allocation rule set includes a rule to determine the subset of computer clusters based at least in part on the data representative of the account;
   selecting a first computer cluster from said subset of computer clusters using an allocation heuristic, the allocation heuristic selecting the first computer cluster based on the first computer cluster having a highest ratio of computing resources to user accounts amongst the subset of computer clusters;
   assigning said first customer to said first computer cluster, the first computer cluster to provide the online services to the first customer;
   storing a representation of the assignment of the first customer to the first computer cluster in a database, the representation instructing a front-end server to route, based on the stored representation, online service requests originating from the first customer to the first computer cluster; and
   routing future online service requests received from the first customer to the first computer cluster based on the stored representation in the database.

2. The method of providing online services as set forth in claim 1 wherein said allocation rule set selects said subset of computer clusters based upon said first customer's geographic location.

3. The method of providing online services as set forth in claim 1 wherein said allocation rule set selects said subset of computer clusters based upon a type of service requested by said first customer.

4. The method of providing online services as set forth in claim 1, said method further comprising:
periodically reviewing a database of customer usage logs; and
reallocating a second customer from a second computer cluster to a third computer cluster based upon said customer usage log of said second customer.

5. The method of providing online services as set forth in claim 4 wherein said reallocating one or more customers to a different computer cluster comprises:
copying a user account associated with said second customer from said second computer cluster to said third computer cluster.

6. The method of providing online services as set forth in claim 5 wherein said reallocating one or more customers to a different computer cluster comprises:
removing said user account from said second computer cluster after said second customer has used said user account in said third computer cluster.

7. The method of providing online services as set forth in claim 1, said method further comprising:
receiving a service request from said first customer at a front-end server;
retrieving an address associated with said first computer cluster assigned to said first customer; and
re-directing said first customer to said first server cluster using said address associated with said first computer cluster.

8. The method of providing online services as set forth in claim 7 wherein said service request includes an address comprising a domain name and a user identifier associated with said first customer.

9. An online service system, said online service system comprising:
a front-end server cluster;
a plurality of computer clusters for providing an online service; and
an allocation module associated with said front-end server cluster, said allocation module accepting a registration from a first customer comprising information about said first customer, said allocation module processing said information with an allocation rule set to determine a subset of computer clusters from said plurality of computer clusters, the information about said first customer including data representative of an account and the allocation rule set including a rule to determine the subset of computer clusters based at least in part on the data representative of the account, selecting a first computer cluster from said subset of computer clusters using an allocation heuristic, the allocation heuristic selecting the first computer cluster based on the first computer cluster having a highest ratio of computing resources to user accounts amongst the subset of computer clusters, the first computer cluster to provide the online services to the first customer, storing, in a database, a representation of the selected first computer cluster in association with data representative of the first customer, the representation of the selected first computer cluster instructing the front-end server cluster to route, based on the stored representation, online service requests originating from the first customer to the first computer cluster, and routing future online service requests from the first customer to the first computer cluster based on the stored representation in the database.

10. The online service system as set forth in claim 9 wherein said allocation rule set determines said subset of computer clusters based upon a geographic location of said first customer.

11. The online service system as set forth in claim 9 wherein said allocation rule set determines said subset of computer clusters based upon a type of service requested by said first customer.

12. The online service system as set forth in claim 9, said system further comprising:
a load re-balancing module, said load re-balancing module periodically reviewing a database of customer usage logs and reallocating a second customer from a second computer cluster to a third computer cluster based upon said customer usage log of said second customer.

13. The online service system as set forth in claim 12 wherein said load re-balancing module copies copying a user account associated with said second customer from said second computer cluster to said third computer cluster.

14. The online service system as set forth in claim 13 wherein said load re-balancing module deletes said user account from said second computer cluster after said second customer has used said user account in said third computer cluster.

15. The online service system as set forth in claim 9 wherein said front-end server cluster receives a service request from said first customer and re-directs said first customer to an address associated with said first server cluster.

16. The online service system as set forth in claim 15 wherein said service request includes an address comprising a domain name and a user identifier associated with said first customer.

17. A non-transient machine-readable medium, said machine-readable medium comprising a set of computer instructions that when executed implement a method of providing online services from more than one computer cluster, said method comprising:
accepting a registration for online services from a first customer, said registration comprising a first set of information about said first customer;
processing said first set of information about said first customer with an allocation rule set to determine a subset of computer clusters from said more than one computer clusters, the first set of information about said first customer including data representative of an account and the allocation rule set includes a rule to determine the subset of computer clusters based at least in part on the data representative of the account;
selecting a first computer cluster from said subset of computer clusters using an allocation heuristic, the allocation heuristic selecting the first computer cluster based on the first computer cluster having a highest ratio of computing resources to user accounts amongst the subset of computer clusters;
assigning said first customer to said first computer cluster, the first computer cluster to provide the online services to the first customer;
storing a representation of the assignment of the first customer to the first computer cluster in a database, the representation instructing a front-end server to route, based on the stored representation, online service requests from the first customer to the first computer cluster; and routing future online service requests received from the first customer to the first computer cluster based on the stored representation in the database.

18. The non-transient machine-readable medium as set forth in claim 17 wherein said allocation rule set selects said subset of computer clusters based upon said first customer's geographic location.

19. The non-transient machine-readable medium as set forth in claim 17 wherein said allocation rule set selects said subset of computer clusters based upon a type of service requested by said first customer.

20. The non-transient machine-readable medium as set forth in claim 17 wherein said method implemented by said computer instructions further comprises:
   periodically reviewing a database of customer usage logs; and
   reallocating a second customer from a second computer cluster to a third computer cluster based upon said customer usage log of said second customer.

21. The non-transient machine-readable medium as set forth in claim 20 wherein said computer instructions for reallocating one or more customers to a different computer cluster comprises implement:
   copying a user account associated with said second customer from said second computer cluster to said third computer cluster.

22. The non-transient machine-readable medium as set forth in claim 21 wherein said reallocating one or more customers to a different computer cluster comprises:
   removing said user account from said second computer cluster after said second customer has used said user account in said third computer cluster.

23. The non-transient machine-readable medium as set forth in claim 17 wherein said method implemented by said computer instructions further comprises:
   receiving a service request from said first customer at a front-end server;
   retrieving an address associated with said first computer cluster assigned to said first customer; and
   re-directing said first customer to said first server cluster using said address associated with said first computer cluster.

24. The non-transient machine-readable medium as set forth in claim 23 wherein said service request includes an address comprising a domain name and a user identifier associated with said first customer.

* * * * *